United States Patent [19]

Dymond et al.

[11] Patent Number: 5,086,246
[45] Date of Patent: Feb. 4, 1992

[54] SALIENT POLE ROTOR FOR A DYNAMOELECTRIC MACHINE

[75] Inventors: James H. Dymond, Peterborough; Nick N. Saidi, Ajax; John M. Young, Omemee, all of Canada

[73] Assignee: General Electric Canada Inc., Mississauga, Canada

[21] Appl. No.: 650,540

[22] Filed: Feb. 5, 1991

[30] Foreign Application Priority Data

Feb. 22, 1990 [CA] Canada ................................ 2010670

[51] Int. Cl.$^5$ ............................................. H02K 1/24
[52] U.S. Cl. ................................... 310/269; 310/58; 310/60 R; 310/91; 310/194
[58] Field of Search ................. 310/269, 261, 58, 59, 310/61, 62, 63, 64, 65, 60 R, 60 A, 91, 42, 254, 218, 52, 208, 194

[56] References Cited

U.S. PATENT DOCUMENTS

| | | |
|---|---|---|
| 894,015 | 7/1908 | Kishi ................................ 310/269 |
| 896,323 | 8/1908 | Reist ................................ 310/269 |
| 928,037 | 7/1909 | Frost ................................ 310/269 |
| 1,030,041 | 6/1912 | Williamson ..................... 310/269 |
| 2,899,573 | 8/1959 | Wesolowski ............. 310/269 U X |
| 3,590,301 | 6/1971 | Woydt ............................. 310/269 |
| 3,739,212 | 6/1973 | Koelbel et al. ................. 310/194 |
| 3,846,651 | 11/1974 | Mishra ............................. 310/61 |
| 4,383,191 | 5/1983 | Mazuyama ..................... 310/59 |
| 4,467,229 | 8/1984 | Ogita ............................... 310/64 |
| 5,036,238 | 7/1991 | Tajima ............................. 310/269 |

FOREIGN PATENT DOCUMENTS

| | | |
|---|---|---|
| 909844 | 9/1972 | Canada . |
| 1181118 | 1/1985 | Canada . |
| 1194531 | 10/1985 | Canada . |
| 0063530 | 5/1980 | Japan ............................... 310/269 |
| 0063540 | 5/1980 | Japan ............................... 310/269 |
| 2066585 | 2/1981 | United Kingdom ............ 310/269 |

Primary Examiner—R. Skudy

[57] ABSTRACT

A dynamoelectric machine has a stator with a stator core and a plurality of spaced apart radially extending ventilation ducts. A rotor mounted for rotation within the stator has a shaft with a plurality of salient poles. Each salient pole has a winding on it and each pole with its winding constitutes a pole member. Adjacent pole members define between them an interpolar space. Cooling air enters each interpolar space from each end when the machine is operating, moves generally axially as portions of the air change direction to move radially outwards through the air gap separating the rotor and stator and then through the ventilation ducts. The air flow, in a radial outward direction, tends to be less at the ends of the rotor and through the ventilation ducts adjacent the ends of the stator. The invention places a baffle at each end of each interpolar space. The baffle is in a generally radial plane and has an outward edge adjacent the outer limit of the interpolar space as defined by the tips of the poles, and an inward edge spaced from the bottom of the interpolar space. The baffle improves the air flow radially outwards adjacent the ends of the rotor and the stator.

6 Claims, 3 Drawing Sheets

SALIENT POLE ROTOR FOR A DYNAMOELECTRIC MACHINE

BACKGROUND OF THE INVENTION

This invention relates to a salient pole rotor for a dynamoelectric machine, and in particular it relates to a rotor having a baffle arrangement to improve the air flow distribution.

In a dynamoelectric machine having a rotor with salient poles, it is desirable to have not only the temperatures axially along the rotor as uniform or even as possible, but also to have the temperatures axially along the stator as even as possible. In a machine with no rotor fan, the circulation of the cooling gas (which will be referred to hereinafter as air) is pumped or driven by the rotating rotor across the air gap and through ventilation gaps or ducts in the stator core. The temperatures of the stator core, measured axially along the core, tend to be higher at the ends of the core. This is usually because the static pressure of the circulating air at the ducts adjacent the ends of the stator core tends to be lower. It is, of course, the higher temperatures that must limit the operation of the machine, and it is desirable that the higher temperatures be reduced.

SUMMARY OF THE INVENTION

The present invention provides a baffle arrangement which tends to increase the static pressure adjacent to the ends of a salient pole dynamoelectric machine, and consequently increase the flow of cooling air in the portions of the machine adjacent the ends.

It is therefore an object of the invention to provide for a dynamoelectric machine, a salient pole rotor having a baffle arrangement for increasing the static pressure of the cooling air as it leaves the end portions of the rotor and enters cooling ducts adjacent to the ends of the stator.

It is another object of the invention to provide a baffle for a salient pole rotor where the baffle extends in a substantially radial plane between adjacent pole members at the ends thereof and having a radially outward edge adjacent the periphery of the rotor and an inward edge spaced from the bases of the adjacent pole members.

In accordance with one form of the invention there is provided a dynamoelectric machine having a salient pole rotor with an axially extending shaft mounted for rotation within a stator, the rotor having no ventilation fan associated therewith, the rotor and the stator defining therebetween an air gap, the stator having a stator core with stator windings thereon, the stator having a plurality of spaced apart, ventilation ducts extending radially from the air gap to an exhaust region, the dynamoelectric machine being cooled by a cooling gas circulated through the rotor and stator, the rotor comprising a plurality of axially extending, spaced apart poles, mounted on the shaft, each pole having a base where it mounts to the shaft and a pole tip radially outwards of the base and defining a periphery of rotation, a winding on each pole, each pole and respective winding thereon forming a pole member, adjacent pole members defining therebetween an interpolar space, at least one coil bracket in each interpolar space, each coil bracket having a central portion with extending arm portions, means for fastening each coil bracket to the shaft at the central portion thereof, the respective arm portions engaging the surface of the adjacent windings of adjacent pole members for aiding in securing the windings, a baffle at each end of each interpolar space, each of the baffles being in a substantially radial plane and extending between adjacent pole members with a radially outward edge adjacent the periphery of rotation and an inward edge spaced outwardly from the bases of the adjacent pole members, with rotation of the rotor the baffles tending to increase at each end of the rotor the static pressure of the cooling gas within the machine in the air gap adjacent the ends of the rotor thereby improving the flow of the cooling gas radially outwards through the air gap and the stator ventilation ducts adjacent the ends of the stator.

BRIEF DESCRIPTION OF THE DRAWINGS

The invention will be described with reference to the accompanying drawings, in which.

DETAILED DESCRIPTION OF THE PREFERRED EMBODIMENTS

Figure 1:
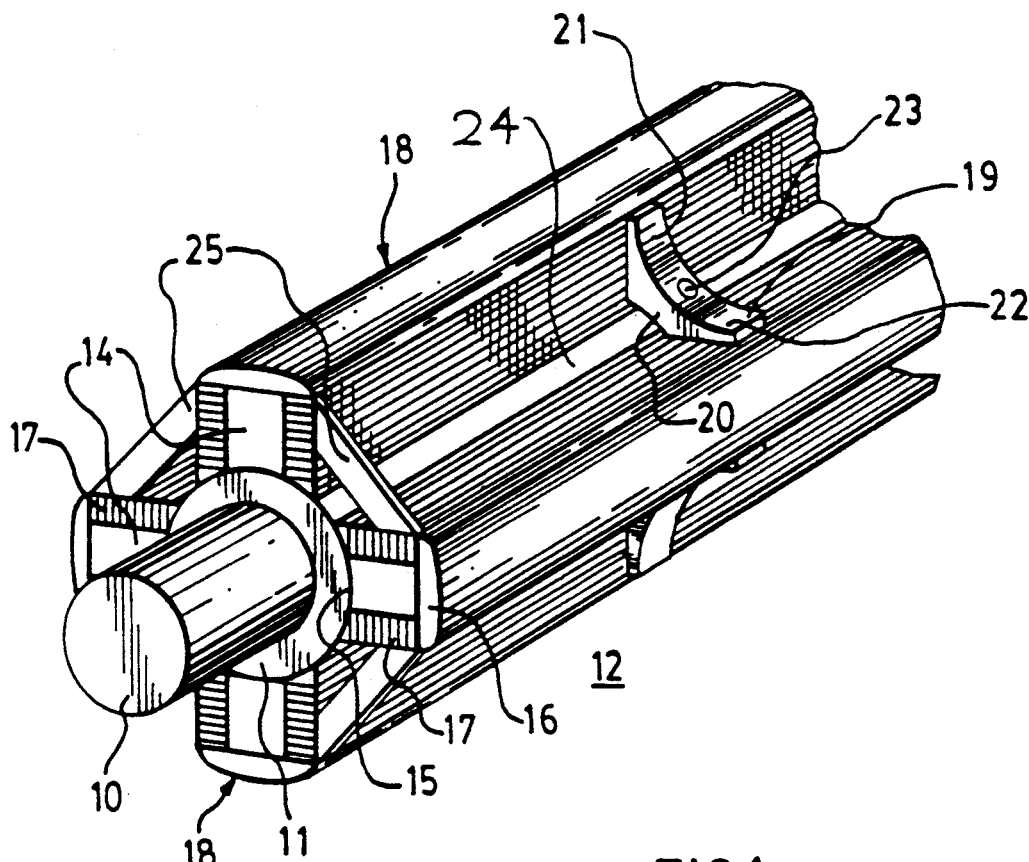
FIG. 1 is a partial isometric view of a salient pole rotor according to one form of the invention.

Referring first to FIG. 1, there is shown an isometric view of one end of a salient pole rotor 12 having a shaft 10 and a rim 11. Four salient poles 14 are mounted to rim 11. Each pole 14 has a base 15 and a pole tip 16. Also, each pole has a winding 17, as shown. The turn portions or end portions of the winding 17 have been omitted for ease of drawing. Each pole 14 with its respective winding 17 forms a pole member 18. The region or space between adjacent pole members 18 may be referred to as an interpolar space 24, and in each interpolar space 24 there is at least one coil bracket 19. Each coil bracket 19 has a central portion 20 and extending arms 21 and 22 which extend in opposite directions. A bolt 23 through the central portion 20 secures the coil bracket 19 to the rim 11. The arms 21 and 22 engage the surface of the respective windings 17 of the adjacent ones of pole members 18 to assist in holding the windings or coils in place against forces caused by rotation. As will be discussed hereinafter, there may be a plurality of spaced apart coil brackets 19 in each interpolar space 24 and the central portion 20 may have different thicknesses, that is, the outer surface of the central portions may be at different radial distances from the axis of rotation.

At each end of rotor 12 in each interpolar space 24 there is a baffle 25 which lies in a substantially radial plane. Baffle 25 is also shown, for example, in FIG. 3A.

Figure 3A:
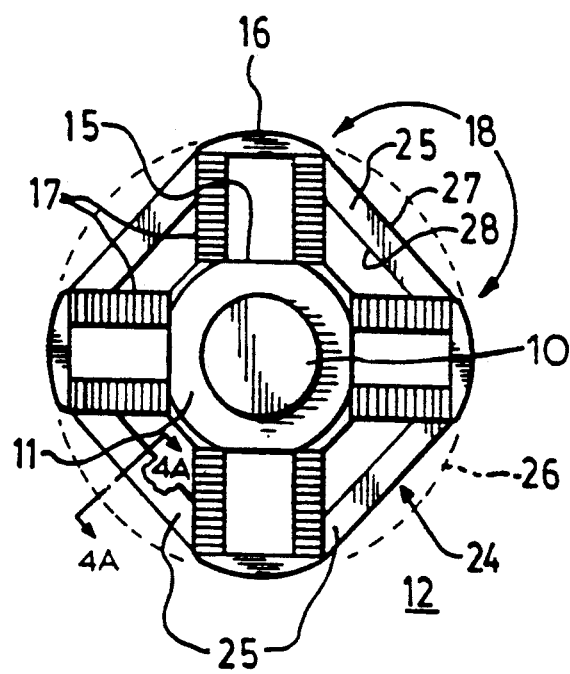

Referring for the moment to FIG. 3A, there is shown an end view of a rotor 12, again with the ends of windings 17 omitted. The rotor 12, when rotating, defines with the pole tips 16 a periphery of rotation 26, indicated by a broken line. Each baffle 25 extends between adjacent ones of pole members 18 and has an outer edge 27 which is adjacent the periphery of rotation 26 and an inner edge 28 spaced outwardly of the bases 15 of the adjacent ones of pole members 18. Thus, the baffles 25 extend across the radially outward portion of the end of each interpolar space 24 but do not extend across the inner portion. The outward edge 27 of each baffle may be straight as shown in FIG. 3A or curved as shown in FIG. 3B.

Figure 3B:
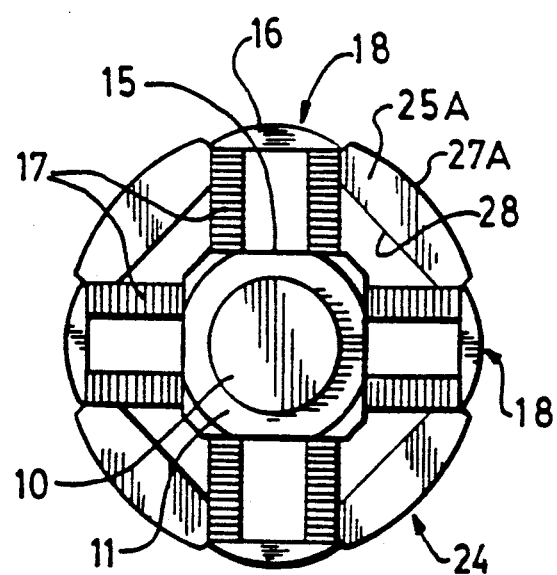

Referring for the moment to FIG. 3B, there is shown an end view of a rotor 12, similar to that of FIG. 3A, but with a baffle 25A that has a different configuration. The baffle 25A has a straight inner edge 28, but has an outer edge 27A which is curved and generally follows the periphery of rotation 26. Thus, the outer edge of each baffle (in a radial direction) may be straight, curved or a combination of straight and curved. In each instance the outer edge of the baffles is adjacent the periphery of rotation.

Figure 4B:
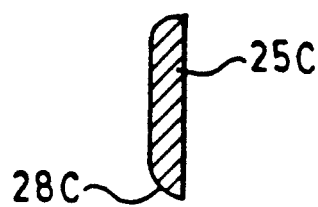
FIGS. 4A and 4B are cross sectional views of two forms of baffle according to the invention.
Figure 4A:
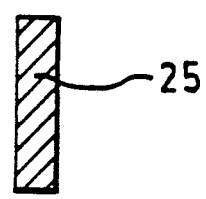

Referring to FIGS. 4A and 4B, there is shown in FIG. 4A a cross-sectional view of baffle 25, and there is shown in FIG. 4B a cross-sectional view of an alternate form of a baffle 25C. Baffle 25C has at least an inner edge 28C that is curved on the outer surface in an axial direction inward to improve the air or gas flow into the interpolar spaces. The baffles 25C may be said to form a bell-mouth at the end of the rotor. The baffle 25C, as shown, has both inner and outer edges curved.

Figure 2:
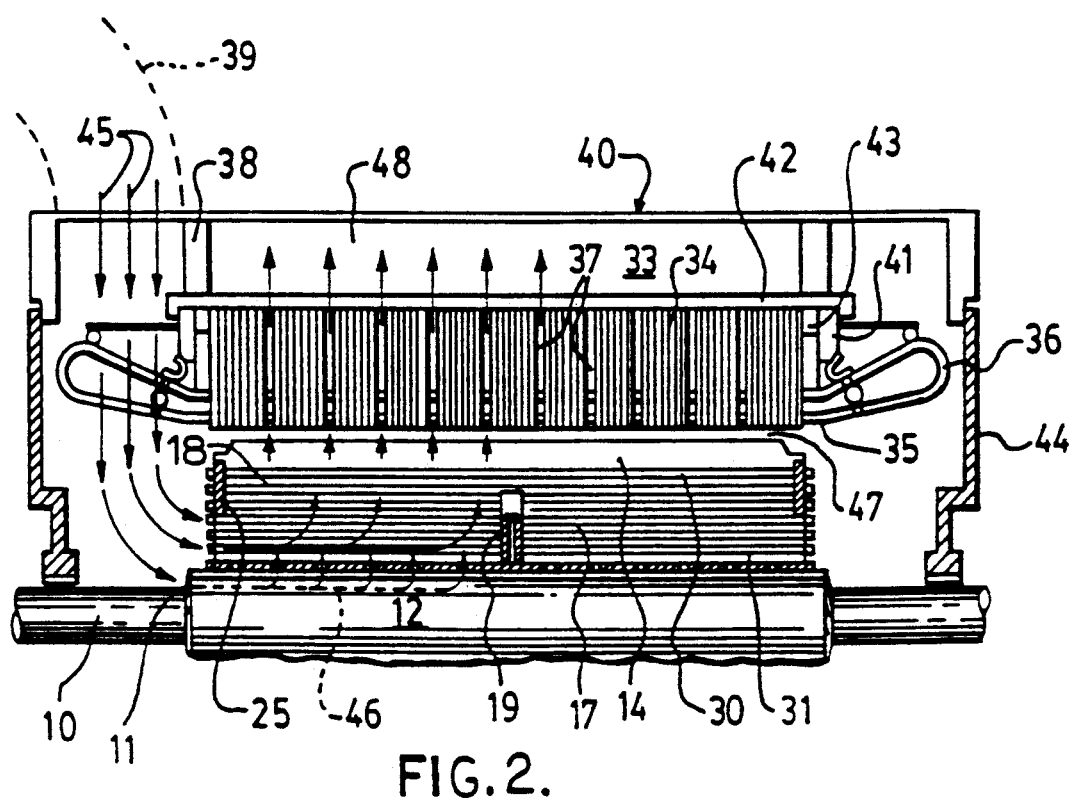
FIG. 2 is a partial sectional side view of a dynamoelectric machine having a rotor similar to that of FIG. 1, FIGS. 3A and 3B are end views of a salient pole rotor each showing a different form of baffle on the rotor.

Referring now to FIG. 2, there is shown a sectional side view of a dynamoelectric machine having a rotor 12 as described, for example, in connection with FIGS. 1, 3A, 3B, 4A and 4B. The winding 17 is shown on pole 14 between pole collars 30 and 31. One coil bracket 19 is shown midway between the ends of pole member 18. A baffle 25 is shown at each end of pole member 18.

Stator 33 has a stator core 34 with a winding 35 having end turns 36. The stator core 34 has a plurality of radially extending, axially spaced, ventilation ducts 37. A stator frame 40 includes stator core support plates 38, stator core flanges 41, stator core bars 42, and space blocks 43. Bearing bracket assemblies 44, represented schematically, include bearings for supporting shaft 10 to provide for rotational movement of the rotor. Stator structures of this form are known.

When the machine is operating, the flow of cooling air (or other cooling gas) is indicated by arrows 45. The air flow is indicated by arrows 45 for only one half of the machine; the air flow is the same for the other half. The air is introduced from a passageway 39, indicated by broken lines, normally from atmosphere, although the passageway 39 could be connected to receive recirculated air as is known.

There are frequently axially extending air passages in rim 11 as is indicated by broken line 46 representing air flow through such a passage and through openings in rim 11 into the interpolar spaces to improve the cooling of the inner parts of windings 17. The air flow passes from the interpolar spaces radially outwards through air gap 47 between the periphery of pole members 18 and the stator core 34, and then through ventilation ducts 37 into exhaust region 48 which is open to atmosphere.

Figure 5A:
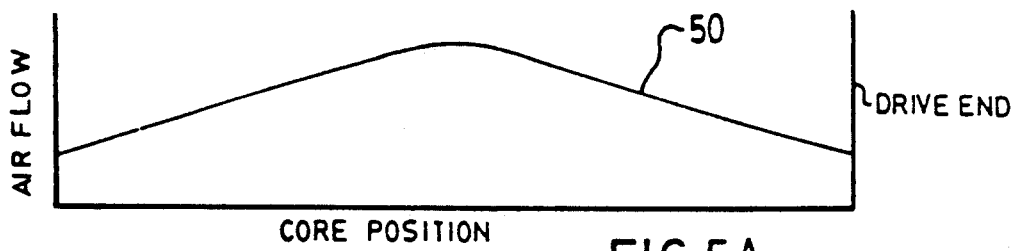
FIGS. 5A, 5B and 5C are graphs useful in explaining the invention.
Figure 5B:
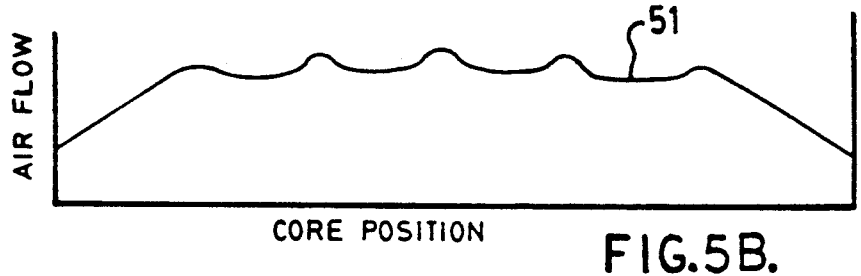
Figure 5C:
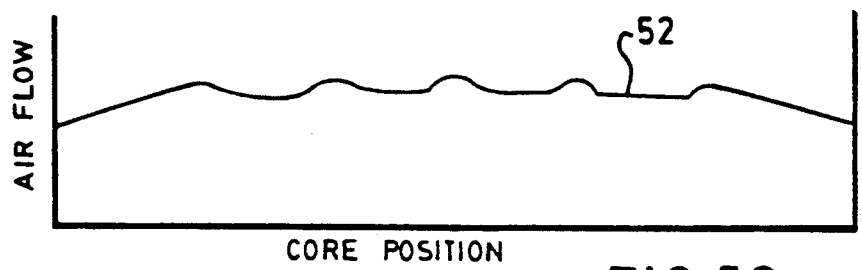

Referring now to FIGS. 5A, 5B and 5C, there are shown graphs of air flow against axial positions along a stator core giving relative air flow through the ventilation ducts 37 (FIG. 2). In FIG. 5A, a line 50 indicates air flow through the ventilation ducts in a machine with a salient pole rotor having one coil bracket, centrally located in each interpolar space, and no baffle 25 (FIGS. 1, 2, 3A and 3B, for example). The air flow tends to be greater in the central region where the air flow from each end meets. This is increased to some extent by the coil bracket which tends to act as a fan blade.

FIG. 5B has a line 51 representing air flow through ventilation ducts at different axial positions where the rotor has five coil brackets in each interpolar space, spaced along the rotor. Because each coil bracket acts somewhat as a fan blade, the air flow is slightly greater in the region of each coil bracket. In fact, suitable placing of the coil brackets where the air flow is a little less tends to distribute the flow as desired. In addition, the change in air flow contributed by a coil bracket can be altered to some extent by changing the thickness of the central portion 20 (FIG. 1) of the coil bracket. The effect of the coil brackets can be determined by experiment.

In FIG. 5C the line 52 represents air flow in the ventilation ducts of a machine similar to the machine where the air flow is represented by FIG. 5B, but with a rotor 12 which has baffles 25 on the rotor as described in connection with FIGS. 1, 2, 3A and 3B, for example. The air flow in the ventilation ducts 37 (FIG. 2) which are adjacent the ends of the stator has been increased. The addition of the baffles of the invention does not make the air flow in the end ventilation ducts equal to the air flow through the ducts in the central part of the stator, but it does increase it.

In one example, a dynamoelectric machine model with a salient pole rotor according to FIGS. 1 and 2 was rotated at 450 rpm and the static pressure was measured, in inches of water, at the two end ventilation ducts and at several intermediate ventilation ducts (at two radial positions in each measured duct). Without baffles installed, the static pressure at the end opposite the drive end was 0.10 inches of water and at the drive end was 0.12 inches of water. With baffles according to the invention installed at both ends of each interpolar space, the static pressure measured at the end opposite the drive end was 0.45 inches of water, and at the drive end was 0.54 inches of water. The static pressure at the intermediate points had also increased. As the static pressure is a determining factor in air flow, other things being the same, the baffles would result in an increase in air flow through the end ducts. Thus, the increased air flow not only improves the cooling of the rotor, but improves the cooling of the end regions of the stator.

Figure 6A:
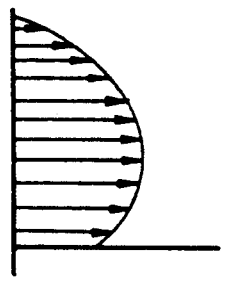
FIGS. 6A and 6B are air velocity diagrams useful in the description.

It is believed that the following description explains how the baffles improve the air flow and the cooling of the rotor and of the end regions of the stator. In a salient pole rotor, the pole members themselves tend to move air radially outwards. The coil brackets tend to increase the outward flow in the region where they are mounted. Thus, the air flows into the interpolar spaces from each end and changes direction to flow radially outwards through the air gap and the stator ventilation ducts. The axial air velocity tends to be greater at the bottom of each interpolar space, and a typical air velocity profile for the rotor interpolar area is shown in FIG. 6A. In reality, there tends to be some back flow or reverse flow, as shown by the air velocity profile of FIG. 6B. The air entering the interpolar area is acted upon by several forces, mainly centrifugal force and coriolis force. The interaction of the centrifugal force, $F_f$, represented by the equation $F_f \alpha r \cdot \omega^2$ and the coriolis force, $F_c$, represented by the equation $F_c \alpha V_a \omega$ determine the flow direction. In the above equations, r is the radius from the axis, ω is the angular velocity, and $V_a$ is the axial velocity of the air.

Figure 6B:
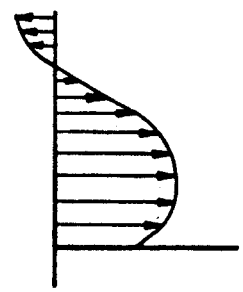
Figure 7A:
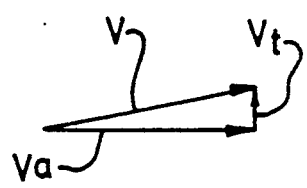
FIGS. 7A, 7B and 7C are vector diagrams useful in the description.
Figure 7B:
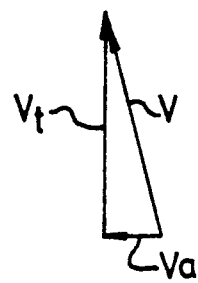

At the shaft the axial velocity, $V_a$, is very high and it decreases in magnitude when moved radially outwards, reducing to zero and then reversing as shown in FIG. 6B. The tangential velocity of the air, $V_t$, is low near the shaft and increases when moved radially outwards. Therefore, the typical velocity vectors at the shaft are as shown in FIG. 7A and at the air gap are as shown in FIG. 7B. V represents the relative resultant velocity.

Figure 7C:
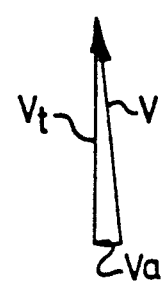

By placing a baffle at the end of the interpolar space adjacent to the air gap, $V_a$ is reduced and the flow becomes substantially radial as shown in FIG. 7C. Hence the air is directed almost radially outwards into the first few ventilation ducts in the stator. The baffles also tend to increase the radial and tangential velocity components because the baffles are a rotating surface. This combination or interaction tends to increase the air flow in the end regions of the rotor and of the stator.

It is believed the preceding description adequately explains the invention.

What we claim as new and desire to secure by Letters Patent of the United States is:

1. A dynamoelectric machine having a salient pole rotor with an axially extending shaft mounted for rotation within a stator, the rotor having no fan associated therewith, the rotor and stator defining therebetween an air gap, the stator having a stator core with stator windings thereon, and a plurality of spaced apart ventilation ducts located between axially opposing ends of the stator and extending radially from the air gap to an exhaust region, said dynamoelectric machine being cooled by a cooling gas circulated through said rotor and said stator, said rotor comprising a plurality of axially extending, spaced apart poles, mounted on said shaft, each pole having a base where it mounts to said shaft and a pole tip radially outward of said base and defining a periphery of rotation, a winding on each said pole, each said pole and respective winding thereon forming a pole member, adjacent pole members defining therebetween an interpolar space, at least one coil bracket in each interpolar space, each said coil bracket having a central portion with extending arm portions, means for fastening each said coil bracket to said shaft at the central portion of said bracket, respective arm portions of said coil bracket engaging adjacent surfaces of the windings of adjacent pole members for aiding in securing said windings, a baffle at each end of each said interpolar space, each of said baffles being in a substantially radial plane and extending between adjacent ones of said pole members, each said baffle having a radially outward edge adjacent said periphery of rotation and an inward edge spaced outwardly from said bases of adjacent ones of said pole members, with rotation of said rotor said baffles tending to increase at each end of said rotor static pressure of said cooling gas within said machine in said air gap adjacent the ends of said stator, thereby improving flow of said cooling gas radially outwards through said air gap and said ventilation ducts adjacent the ends of said stator.

2. A dynamoelectric machine as defined in claim 1 in which said outward edge of each said baffle is straight.

3. A dynamoelectric machine as defined in claim 1 in which said radially outward edge of each said baffle is curved generally to follow said periphery of rotation.

4. A dynamoelectric machine as defined in any of claims 1, 2 or 3 in which said inward edge of each said baffle is straight.

5. A salient pole rotor for a dynamoelectric machine having no ventilation fan associated therewith, comprising a shaft having a longitudinal axis, a plurality of poles mounted on said shaft and extending axially, each said pole having a pole tip at a distance from said longitudinal axis, said pole tips defining a periphery of rotation, a winding on each said pole, each said pole and said winding thereon forming a pole member, adjacent ones of said pole members defining therebetween an interpolar space, and a generally wedge-shaped baffle for improving air flow in the machine at each end of each said interpolar space, each said baffle extending between adjacent pole members across the interpolar space and having a radially outward edge adjacent said periphery of rotation and an inward edge spaced radially outward from a bottom of the shaft.

6. A salient pole rotor as defined in claim 5 in which said inward edge of each said baffle has an axially extending curve forming a bell mouth configuration.

* * * * *